United States Patent
Hu et al.

(10) Patent No.: US 11,616,271 B2
(45) Date of Patent: Mar. 28, 2023

(54) BATTERY SEPARATOR INCLUDING INORGANIC COATING DISPOSED ON DENSE LAYER FORMED ON SUPPORT LAYER, AND METHOD FOR PREPARING THE SAME

(71) Applicant: FIBRWAY MATERIAL SCIENCE & TECHNOLOGY DEVELOPMENT CO., LTD., Guangzhou (CN)

(72) Inventors: Jian Hu, Guangzhou (CN); Jin Long, Guangzhou (CN); Yunzhen Yao, Guangzhou (CN); Yi Wang, Guangzhou (CN); Yang Wang, Guangzhou (CN); Ling Meng, Guangzhou (CN)

(73) Assignee: FIBRWAY MATERIAL SCIENCE & TECHNOLOGY DEVELOPMENT CO., LTD., Guangzhou (CN)

( * ) Notice: Subject to any disclaimer, the term of this patent is extended or adjusted under 35 U.S.C. 154(b) by 288 days.

(21) Appl. No.: 16/909,004

(22) Filed: Jun. 23, 2020

(65) Prior Publication Data
US 2020/0321583 A1 Oct. 8, 2020

Related U.S. Application Data

(63) Continuation of application No. PCT/CN2017/118479, filed on Dec. 26, 2017.

(51) Int. Cl.
*H01M 50/431* (2021.01)
*H01M 50/44* (2021.01)
(Continued)

(52) U.S. Cl.
CPC ....... *H01M 50/431* (2021.01); *H01M 50/403* (2021.01); *H01M 50/4295* (2021.01); *H01M 50/44* (2021.01); *H01M 10/0525* (2013.01)

(58) Field of Classification Search
CPC .......... H01M 50/431; H01M 50/4295; H01M 50/403; H01M 50/44
(Continued)

(56) References Cited

U.S. PATENT DOCUMENTS

| | | | |
|---|---|---|---|
| 6,200,706 B1 | 3/2001 | Ashida et al. | |
| 2016/0049627 A1 | 2/2016 | Hu et al. | |
| 2019/0221807 A1* | 7/2019 | Oura | H01M 4/628 |

FOREIGN PATENT DOCUMENTS

| | | |
|---|---|---|
| CN | 1882436 A | 12/2006 |
| CN | 102117905 A | 7/2011 |

(Continued)

OTHER PUBLICATIONS

First Notice of Reasons for Refusal issued in counterpart Japanese Patent Application No. 2020-533841, dated Jun. 14, 2021.
(Continued)

*Primary Examiner* — Sean P Cullen
(74) *Attorney, Agent, or Firm* — Westbridge IP LLC

(57) ABSTRACT

A battery separator and a preparation method therefor are provided. The separator includes a lithium ion battery separator substrate and an inorganic coating, the lithium ion battery separator substrate consists of a support layer and a dense layer, and the inorganic coating is coated on the dense layer; the separator has excellent high-temperature resistance, and still has good strength retention and the heat shrinkage rate thereof is no more than 2% after treatment at 300° C. for 1 h, and thus ensures the stability and isolation of the rigid structure of the separator coating at high temperatures; the substrate has a uniform and compact double-layer structure, effectively controls phenomena such as pinholes and filler particles fall-off in a subsequent coating process, and meets the requirements of lithium ion battery
(Continued)

separators with respect to heat resistance, porosity and strength, thus having excellent comprehensive performance.

10 Claims, 1 Drawing Sheet

(51) Int. Cl.
*H01M 50/403* (2021.01)
*H01M 50/429* (2021.01)
*H01M 10/0525* (2010.01)

(58) Field of Classification Search
USPC .............................. 429/144, 145, 251, 254
See application file for complete search history.

(56) References Cited

FOREIGN PATENT DOCUMENTS

| | | | | |
|---|---|---|---|---|
| CN | 102394282 | A | | 3/2012 |
| CN | 102751462 | A | | 10/2012 |
| CN | 103000848 | A | * | 3/2013 |
| CN | 103000848 | A | | 3/2013 |
| CN | 103137931 | A | | 6/2013 |
| CN | 104157812 | A | * | 11/2014 ........ H01M 10/0525 |
| CN | 104157812 | A | | 11/2014 |
| CN | 104332577 | A | | 2/2015 |
| CN | 104870156 | A | | 8/2015 |
| JP | 2012199034 | A | | 10/2012 |
| JP | 2014022094 | A | | 2/2014 |
| JP | 2014060123 | A | | 4/2014 |
| JP | 2015060702 | A | | 3/2015 |

OTHER PUBLICATIONS

First Office Action issued in counterpart Chinese Patent Application No. 201711442897.3, dated May 22, 2020.
International Search Report and Written Opinion issued in corresponding PCT Application No. PCT/CN2017/118479, dated Sep. 7, 2018.
Long et al., A Nano-Based Multilayer Separator for Lithium Rechargeable Battery, International Journal of Electrochemical Science, vol. 11, 2016, pp. 6552-6563, dated Jul. 7, 2016.
Notice of Final Rejection issued in counterpart Korean Patent Application No. 10-2020-7016804, dated May 20, 2022.
Request for the Submission of an Opinion issued in counterpart Korean Patent Application No. 10-2020-7016804, dated Oct. 22, 2021.
Second Notice of Reasons for Refusal issued in counterpart Japanese Patent Application No. 2020-533841, dated Mar. 8, 2022.
Second Office Action issued in counterpart Chinese Patent Application No. 201711442897.3, dated Jan. 28, 2021.
Third Office Action issued in counterpart Chinese Patent Application No. 201711442897.3, dated Aug. 2, 2021.

* cited by examiner

BATTERY SEPARATOR INCLUDING INORGANIC COATING DISPOSED ON DENSE LAYER FORMED ON SUPPORT LAYER, AND METHOD FOR PREPARING THE SAME

CROSS-REFERENCE TO RELATED APPLICATIONS

This application is a continuation of International Application No. PCT/CN2017/118479, filed on Dec. 26, 2017, the disclosure of which is hereby incorporated by reference in its entirety.

TECHNICAL FIELD

The disclosure relates to the technical field of battery, in particular, to a battery separator and preparation method and application thereof.

BACKGROUND

The separator is a key technical material to prevent the short circuit of battery. The short circuit of battery greatly accelerates the exothermic decomposition of battery materials, so that it is critical for the battery safety to improve the thermal stability and fusing temperature of the separator.

Compared with conventional polyolefin separators, ceramic-coated separators have greatly improved heat resistance, which are mainly divided into two categories according to the substrate used. One category is conventional polyolefin as a substrate, coated with ceramic particles, and this category of the separators has entered the market in batches; the other is polymer non-woven fabric as a substrate, coated to form a ceramic separator. Polyolefin stretched film (such as polyethylene (PE) or polypropylene (PP) film) has high technology maturity, and has advantages of excellent mechanical properties, chemical stability and relatively lower cost, which is thus currently the dominated separator in the market. However, polyolefin materials have limited temperature resistance, and the suitable working temperature is lower than 150° C. The patent application (Publication No. CN106159163A) in the name of Hefei Guoxuan Hi-Tech Power Co., Ltd. proposes to prepare ceramic-coated separators based on commercial polyethylene separators and the thermal stability of the separators can be effectively improved after being treated at 120° C. for 1 hour. However, as the temperature increases, the skeleton of the ceramic particles is still present while the polyolefin separators melt, resulting in that the strength of the separators is completely lost, so that coating ceramic alone cannot significantly improve the high temperature resistance of the separators.

Non-woven fabric is a material with three-dimensional pore structure formed by non-directional accumulation of fibers. It has the characteristics of flexible selection of raw materials and flexible design of structure. As compared to the polyolefin separator, the non-woven fabric separator has advantages in terms of high temperature resistance, rapid charge and discharge performance and service life, but the non-woven fabric separator has low strength and large pores, which may cause a micro-short circuit of battery. The patent application (Publication No. US20060024569) in the name of Degussa Company in German proposes to use polymer fibers to make a non-woven separator substrate, wherein the substrate is prepared by a single-layer papermaking and both sides are impregnated or coated with a large amount of filler particles to prepare a composite separator with a temperature resistance of 200° C. The filler particles can partially improve the pinhole, so that this separator obtains a good average pore diameter. However, due to the composition of the substrate in this patent, it is inevitable that the separator has large pores and the filler particles are easy to fall off. Further, after testing, when the separator is treated at 300° C. for 1 hour, the substrate melts and the strength of the separator is completely lost. The patent application (Publication No. CN104157812A) in the name of the South China University of Technology proposes to use a multi-layer inclined wire former to prepare a three-layer lithium ion battery separator with an inorganic coating, the dense layer of which however uses some synthetic fibers, and thus the thermal stability of the separator can only achieve that heat shrinkage rate at 110° C. is less than 1.0%, which cannot meet requirements of the high temperature resistant separator for the lithium ion battery. The support layer of the separator completely uses synthetic fibers which are relatively poor lyophilic and easy to introduce air bubbles, so that large holes are formed in the separator.

SUMMARY

The purpose of the disclosure is to overcome the shortcomings of the prior art and provide a lithium ion battery separator and preparation method and application thereof. The separator has excellent high-temperature resistance, and still has good strength retention and the heat shrinkage rate thereof is no more than 2% after treatment at 300° C. for 1 h, and thus ensures the stability and isolation of the rigid structure of the separator at high temperature. The separator better meets the requirements of lithium ion battery separators with respect to heat resistance, porosity and strength, thus having excellent comprehensive performance.

The purpose of the disclosure is achieved by the following technical solutions:

On the first aspect, the disclosure provides a lithium ion battery separator, comprising a lithium ion battery separator substrate and an inorganic coating, wherein the lithium ion battery separator substrate consists of a support layer and a dense layer, wherein the inorganic coating is coated on the dense layer.

According to some examples of the present disclosure, the coating weight of the inorganic coating is 3-15 $g/m^2$, preferably 5-10 $g/m^2$, more preferably 5-8 $g/m^2$, and most preferably 8 $g/m^2$.

According to some examples of the present disclosure, the inorganic coating comprises or consists of inorganic particles, dispersants, water-retaining agents and adhesive resins.

According to some examples of the present disclosure, the inorganic particles are selected from one or more of the group consisting of alumina, silica, boehmite and magnesium hydroxide, preferably alumina and/or magnesium hydroxide; preferably, the ratio of alumina to magnesium hydroxide is 1:1 by weight.

According to some examples of the present disclosure, the inorganic particles have a particle size of less than 3 µm, preferably less than 1 µm, more preferably 200 nm.

According to some examples of the present disclosure, the dispersants are ammonium polycarboxylate; preferably, the ammonium polycarboxylate has a viscosity less than 100 mPa·s.

According to some examples of the present disclosure, the water-retaining agents are sodium carboxymethyl cellulose (CMC); preferably, the sodium carboxymethyl cellulose has a viscosity between 10 mPa·s and 50 mPa·s.

According to some examples of the present disclosure, the adhesive resins are acrylate or styrene-butadiene latex; preferably, the adhesive resins have a viscosity less than 1000 mPa·s.

According to some examples of the present disclosure, the inorganic coatings have 80-87 wt % of the inorganic particles, preferably 80-85 wt %, more preferably 83-85 wt %, more preferably 83-84 wt % and most preferably 84 wt % by weight.

According to some examples of the present disclosure, the inorganic coatings have 0.5-2 wt % of the dispersants, preferably 1-2 wt %, more preferably 1-1.5 wt % and most preferably 1wt %.

According to some examples of the present disclosure, the inorganic coatings have 0.5-4 wt % of the water-retaining agents, preferably 2-4 wt %, more preferably 2-3.5 wt %, more preferably 2-2.5 wt % and most preferably 2 wt %.

According to some examples of the present disclosure, the inorganic coatings have 10-17 wt % of the adhesive resins, preferably 10-14 wt %, more preferably 13-14 wt % and most preferably 13 wt %.

According to some examples of the present disclosure, the support layer comprises or consists of superfine main fibers, thermoplastic bonded fibers and first nanofibers, and the dense layer comprises or consists of second nanofibers.

According to some examples of the present disclosure, the superfine main fibers are selected from one or more of the group consisting of stretched polyethylene terephthalate fibers (stretched PET), polyacrylonitrile fibers (PAN), polyamide fibers (PA) and polypropylene fibers (PP).

According to some examples of the present disclosure, the superfine main fibers are stretched polyethylene terephthalate fibers (stretched PET), polyacrylonitrile fibers (PAN) and/or polyamide fibers (PA).

According to some examples of the present disclosure, the ratio of the stretched polyethylene terephthalate fibers (stretched PET) to the polyacrylonitrile fibers (PAN) to the polyamide fibers (PA) is (1-1.2):(1-1.2): 1, preferably 1:1:1 by weight.

According to some examples of the present disclosure, the thermoplastic bonded fibers are selected from one or more of the group consisting of polyethylene fibers (PE), polypropylene fibers (PP), unstretched polyethylene terephthalate fibers (unstretched PET), PP/PE bi-component fibers, PET/PE bi-component fibers, PET/PP bi-component fibers and PET/co-PET bi-component fibers.

According to some examples of the present disclosure, the thermoplastic bonded fibers are unstretched polyethylene terephthalate fibers (unstretched PET), PET/co-PET bi-component fibers or PP/PE bi-component fibers.

According to some examples of the present disclosure, the first nanofibers and the second nanofibers are independently selected from one or more of the group consisting of fibrillated poly-p-phenylene terephthalamide (PPTA) nanofibers, fibrillated lyocell nanofibers, fibrillated poly-p-phenylene benzodioxazole (PBO) nanofibers, fibrillated polyacrylonitrile (PAN) nanofibers, polyimide (PI) nanofibers and nanocellulose fibers.

According to some examples of the present disclosure, the first nanofibers and the second nanofibers are each independently fibrillated poly-p-phenylene terephthalamide (PPTA) nanofibers, fibrillated lyocell nanofibers, fibrillated poly-p-phenylene benzodioxazole (PBO) nanofibers or fibrillated polyacrylonitrile (PAN) nanofibers.

According to some examples of the present disclosure, the second nanofibers are fibrillated poly-p-phenylene terephthalamide (PPTA) nanofibers and/or fibrillated lyocell nanofibers; preferably, the ratio of the fibrillated poly-p-phenylene terephthalamide (PPTA) nanofibers to fibrillated lyocell nanofibers is 1:(1-4), preferably 1:4 by weight.

According to some examples of the present disclosure, the first nanofibers and the second nanofibers are each independently fibrillated poly-p-phenylene terephthalamide (PPTA) nanofibers, fibrillated tencel nanofibers, fibrillated poly-p-phenylene benzodioxazole (PBO) nanofibers or fibrillated polyacrylonitrile (PAN) nanofibers.

According to some examples of the present disclosure, the second nanofibers are fibrillated poly-p-phenylene terephthalamide (PPTA) nanofibers and/or fibrillated tencel nanofibers; preferably, the ratio of the fibrillated poly-p-phenylene terephthalamide (PPTA) nanofibers to fibrillated tencel nanofibers is 1:(1-4), preferably 1:4 by weight.

According to some examples of the present disclosure, the superfine main fibers have a fiber diameter of 0.1-6 μm, preferably 0.5-4 μm, more preferably 0.5-3 μm, and most preferably 1-3 μm; preferably, the superfine main fibers have a fiber length of 1-6 mm, preferably 2-4 mm, most preferably 3 mm.

According to some examples of the present disclosure, the thermoplastic bonded fibers have a fiber diameter of 0.1-8 μm, preferably 0.5-6 μm, more preferably 1-5 μm, and most preferably 3-5 μm; preferably, the thermoplastic bonded fibers have a fiber length of 1-6 mm, preferably 2-4 mm, most preferably 3 mm.

According to some examples of the present disclosure, the first nanofibers and the second nanofibers have a beating degree of 60-95° SR, preferably 70-95° SR or 60-85° SR.

According to some examples of the present disclosure, the fibrillated lyocell nanofibers have a beating degree of 70-95° SR, preferably 95° SR.

According to some examples of the present disclosure, the fibrillated poly-p-phenylene terephthalamide (PPTA) nanofibers have a beating degree of 60-85° SR, preferably 85° SR.

According to some examples of the present disclosure, the fibrillated poly-p-phenylene benzoxadiazole (PBO) nanofibers and the fibrillated polyacrylonitrile (PAN) nanofibers have a beating degree of 85° SR.

According to some examples of the present disclosure, the lithium ion battery separator substrate comprises 50-99 wt % of the support layer and 1-50 wt % of the dense layer, based on the total basis weight.

According to some examples of the present disclosure, the lithium ion battery separator substrate comprises 50-95 wt % of the support layer and 5-50 wt % of the dense layer, based on the total basis weight.

According to some examples of the present disclosure, the lithium ion battery separator substrate comprises 60-95 wt % of the support layer and 5-40 wt % of the dense layer, based on the total basis weight.

According to some examples of the present disclosure, the lithium ion battery separator substrate comprises 60-80 wt % of the support layer and 20-40 wt % of the dense layer, based on the total basis weight.

According to some examples of the present disclosure, the lithium ion battery separator substrate comprises 80-95 wt % of the support layer and 5-20 wt % of the dense layer, based on the total basis weight.

According to some examples of the present disclosure, the lithium ion battery separator substrate comprises 80 wt % of the support layer and 20 wt % of the dense layer, based on the total basis weight.

According to some examples of the present disclosure, the lithium ion battery separator substrate comprises 60 wt % of the support layer and 40 wt % of the dense layer, based on the total basis weight.

According to some examples of the present disclosure, the lithium ion battery separator substrate comprises 95 wt % of the support layer and 5 wt % of the dense layer, based on the total basis weight.

According to some examples of the present disclosure, in the lithium ion battery separator substrate, the support layer comprises or consists of 30-65 wt % of superfine main fibers, 30-65 wt % of thermoplastic bonded fibers and 5-30 wt % of nanofibers by weight.

According to some examples of the present disclosure, in the lithium ion battery separator substrate, the support layer comprises or consists of 30-45 wt % of superfine main fibers, 30-65 wt % of thermoplastic bonded fibers and 5-30 wt % of nanofibers by weight.

According to some examples of the present disclosure, in the lithium ion battery separator substrate, the support layer comprises or consists of 30-40 wt % of superfine main fibers, 30-65 wt % of thermoplastic bonded fibers, and 5-30 wt % of nanofibers by weight.

According to some examples of the present disclosure, in the lithium ion battery separator substrate, the support layer comprises or consists of 30-65 wt % of superfine main fibers, 30-40 wt % of thermoplastic bonded fibers, and 5-30 wt % of nanofibers by weight.

According to some examples of the present disclosure, in the lithium ion battery separator substrate, the support layer comprises or consists of 30-65 wt % of superfine main fibers, 40-65 wt % of thermoplastic bonded fibers and 5-30 wt % of first nanofibers by weight.

According to some examples of the present disclosure, in the lithium ion battery separator substrate, the support layer comprises or consists of 30-65 wt % of superfine main fibers, 30-65 wt % of thermoplastic bonded fibers and 5-15 wt % of first nanofibers by weight.

According to some examples of the present disclosure, in the lithium ion battery separator substrate, the support layer comprises or consists of 30-65 wt % of superfine main fibers, 30-65 wt % of thermoplastic bonded fibers, and 15-30 wt % of first nanofibers by weight.

According to some examples of the present disclosure, in the lithium ion battery separator substrate, the support layer consists of 30 wt % of superfine main fibers, 65 wt % of thermoplastic bonded fibers and 5 wt % of first nanofibers by weight.

According to some examples of the present disclosure, in the lithium ion battery separator substrate, the support layer consists of 40 wt % of superfine main fibers, 30 wt % of thermoplastic bonded fibers and 30 wt % of first nanofibers by weight.

According to some examples of the present disclosure, in the lithium ion battery separator substrate, the support layer consists of 45 wt % of superfine main fibers, 40 wt % of thermoplastic bonded fibers, and 15 wt % of first nanofibers by weight.

According to some examples of the present disclosure, in the lithium ion battery separator substrate, the support layer consists of 65 wt % of superfine main fibers, 30 wt % of thermoplastic bonded fibers, and 5 wt % of first nanofibers by weight.

According to some examples of the present disclosure, the thickness of the lithium ion battery separator substrate is 10-25 µm, preferably 16-22 µm, more preferably 17-21 µm; preferably, the basis weight of the substrate is 8-17 g/m$^2$, preferably 10-14 g/m$^2$, more preferably 11-13 g/m$^2$; preferably, the average pore size of the substrate is less than 3 µm; the maximum pore size of the substrate is less than 5 µm.

According to some examples of the present disclosure, the thickness of the separator is less than 30 µm, preferably 20-26 µm, more preferably 23-26 µm; preferably, the basis weight of the separator is 15-29 g/m$^2$, preferably 16-25 g/m$^2$, more preferably 19-21 g/m$^2$; preferably, the average pore size of the separator is less than 0.6 µm, preferably 0.1-0.5 µm, more preferably 0.2-0.4 µm; preferably, the maximum pore size of the separator is no more than 1.0 µm, preferably 0.6-1 µm; preferably, the heat shrinkage rate of the separator is no more than 2% at 300° C.

On the second aspect, the disclosure provides a method for preparing the lithium ion battery separator as mentioned above. The method comprises uniformly coating the inorganic coating on the surface of the dense layer of the lithium ion battery separator substrate, and then drying by hot air; preferably, the temperature of the hot air is 80-150° C., preferably 120° C.

According to some examples of the present disclosure, the coating weight of the inorganic coating is 3-15 g/m$^2$, preferably 5-10 g/m$^2$, more preferably 5-8 g/m$^2$, and most preferably 8 g/m$^2$.

According to some examples of the present disclosure, a method for preparing the lithium ion battery separator substrate comprises the following steps in order:

Step a: Mixing the fiber materials of the support layer and the dense layer respectively with water, and then each independently defiberizing, beating and mixing to obtain pulps, and then diluting the pulps with water by a flushing pump to an on-wire concentration;

Step b: Feeding the diluted pulps of the support layer and the dense layer into a HYDROFORMER™, a type of double-layer hydraulic inclined wire former, wherein the pulp of the dense layer enters the upper flow channel and the pulp of the support layer enters the lower flow channel, overlapping the pulp in each flow channel in the same area and making papers at the same time, and draining to obtain a wet paper sheet, forming a wet paper sheet for the substrate; preferably, further comprising rectification of the pulp to make the pulp appear a flow state of high-strength micro-turbulence before making papers;

Step c: After Step b, drying the wet paper sheet for the substrate to obtain a dry paper sheet for the substrate by a Yankee dryer; and Step d: After Step c, calendering the dry paper sheet for the substrate by a metal roller and a soft roller to obtain the substrate.

According to some examples of the present disclosure, in step a, the solid weight percent concentrations of the pulps of the support layer and the dense layer are both 0.2 wt % before diluting with water.

According to some examples of the present disclosure, in step a, the concentrationof the pulp of the support layer onto wire is 0.01-0.05 wt %, preferably 0.01-0.03 wt %, and most preferably 0.015-0.025 wt %; the concentration of the pulp of the dense layer onto wire is 0.002-0.05 wt %, preferably 0.005-0.04 wt %.

According to some examples of the present disclosure, in step b, the flow rate of flow channel of the pulp of the support layer is 160-3000 m$^3$/h, preferably 500-1000 m$^3$/h, more preferably 740 m$^3$/h; the flow rate of flow channel of the pulp of the dense layer is 40-750 m³/h, preferably 100-480 m³/h, more preferably 185 m³/h.

According to some examples of the present disclosure, in step c, the drying temperature is 80-130° C.

According to some examples of the present disclosure, in step d, the calendering temperature is 110-220° C.

According to some examples of the present disclosure, when the thermoplastic bonded fibers in the support layer are unstretched PET fibers, the drying temperature is 80-130° C., preferably 120° C., and the calendering temperature is 170-220° C., preferably 190° C.

According to some examples of the present disclosure, when the thermoplastic bonded fibers in the support layer are PET/co-PET bi-component fibers or PP/PE bi-component fibers, the drying temperature is 80-130° C., preferably 90° C.; and the calendering temperature is 110-140° C., preferably 120° C.

According to some examples of the present disclosure, a method for preparing the inorganic coating comprises: according to the composition of the inorganic coating, sequentially adding the dispersants and the water-retaining agents to the deionized water and stirring; adding the inorganic particles and dispersing; filtering to obtain a dispersion liquid through a strainer; adding the adhesive resins to the dispersion liquid, and continuing to disperse to obtain a pulp of the inorganic coating.

According to some examples of the present disclosure, the coating weight of the inorganic coating is 3-15 g/m², preferably 5-10 g/m², more preferably 5-8 g/m², and most preferably 8 g/m².

According to some examples of the present disclosure, the inorganic coating comprises or consists of inorganic particles, dispersants, water-retaining agents and adhesive resins.

According to some examples of the present disclosure, the inorganic particles are selected from one or more of the group consisting of alumina, silica, boehmite and magnesium hydroxide, preferably alumina and/or magnesium hydroxide; preferably, the ratio of alumina to magnesium hydroxide is 1:1 by weight.

According to some examples of the present disclosure, the inorganic particles have a particle size of less than 3 μm, preferably less than 1 μm, more preferably 200 nm.

According to some examples of the present disclosure, the dispersants are ammonium polycarboxylate; preferably, the ammonium polycarboxylate has a viscosity less than 100 mPa·s.

According to some examples of the present disclosure, the water-retaining agents are sodium carboxymethyl cellulose (CMC); preferably, the sodium carboxymethyl cellulose has a viscosity between 10 mPa·s and 50 mPa·s.

According to some examples of the present disclosure, the adhesive resins are acrylate or styrene-butadiene latex; preferably, the adhesive resins have a viscosity less than 1000 mPa·s.

According to some examples of the present disclosure, the inorganic coating comprises 80-87 wt % of the inorganic particles, preferably 80-85 wt %, more preferably 83-85 wt %, more preferably 83-84 wt % and most preferably 84 wt %.

According to some examples of the present disclosure, the inorganic coating comprises 0.5-2 wt % of the dispersants, preferably 1-2 wt %, more preferably 1-1.5 wt % and most preferably 1wt %.

According to some examples of the present disclosure, the inorganic coating comprises 0.5-4 wt % of the water-retaining agents, preferably 2-4 wt %, more preferably 2-3.5 wt %, more preferably 2-2.5 wt % and most preferably 2 wt %.

According to some examples of the present disclosure, the inorganic coating comprises 10-17 wt % of the adhesive resins, preferably 10-14 wt %, more preferably 13-14 wt % and most preferably 13 wt %.

According to some examples of the present disclosure, the inorganic particles are dispersed at 2500 r/min for 30 min; preferably, the adhesive resins are uniformly dispersed in the dispersion liquid for 15 min; preferably, the strainer is a strainer of 320 mesh; preferably, the pulp of the inorganic coating has a solid content of 40-60%, preferably 50 wt %.

In addition, the disclosure also provides a lithium ion battery comprising the lithium ion battery separator as described above.

Compared with the prior art, the present disclosure has the following advantages that the lithium ion battery separator of the disclosure has a inorganic coating of a specific composition coated on the dense layer of the lithium ion battery separator substrate of the disclosure. Such separator structure can maximize the high temperature resistance and hydrophilicity of the nanofibers, so that the substrate still can maintain good strength and adsorption to the inorganic coating even after treatment at 300° C. for 1 h. In addition, the high temperature stability of the inorganic coating makes the heat shrinkage rate of the separator no more than 2%, ensuring the stability and isolation of the rigid structure of the coating of the composite separator at high temperatures. Furthermore, in the specific composition of the substrate of the disclosure, the use of the nanofibers can also avoid pinholes in the support layer, fill in the large holes that may exist in the support layer, improve the reliability and quality of product, and thus the inorganic coating at a lower coating weight can realize the effective covering of the substrate.

BRIEF DESCRIPTION OF DRAWINGS

Embodiments of the disclosure are described in detail below with reference to the attached drawing figures, wherein.

DETAILED DESCRIPTION OF THE DISCLOSURE

The disclosure will be further described below in conjunction with specific embodiments. It should be understood that the embodiments of the disclosure are only used to illustrate the disclosure, and are not intended to limit the scope of the disclosure.

The experimental methods without specific conditions in the following examples are generally performed under conventional conditions or according to the conditions recommended by the manufacturer. Unless otherwise defined, all professional and scientific terms used in the text have the same meaning as familiar to those skilled in the art. In addition, any methods and materials similar or equivalent to the described content can be applied to the method of the disclosure. The preferred implementation methods and materials described herein are for demonstration purposes only.

Preparation of the Lithium Ion Battery Separator Substrate

Figure 2:
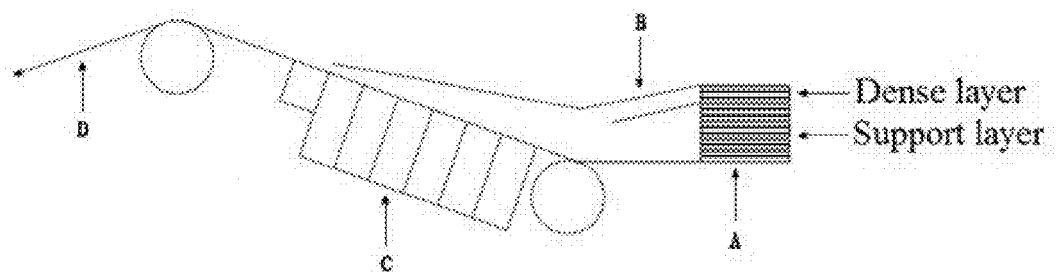
FIG. 2 is a schematic structural view of a HYDROFORMER™, a type of double-layer hydraulic inclined wire former, used in the disclosure, wherein A represents a pulp distributor, B represents a rectifying zone, C represents a substrate forming zone, and D represents a formed wet paper sheet of the substrate.

The following Preparation Examples 1-63 and Comparative Examples 1-11 only disclose examples of using some fiber materials to prepare the substrate, and other fiber materials and combinations thereof given in the disclosure may also be used to prepare the substrate of the disclosure. The schematic structural view of the HYDROFORMER™, a type of double-layer hydraulic inclined wire former, used in Preparation Examples 1-63 of the disclosure is shown in FIG. 2.

Preparation Example 1

A lithium ion battery separator substrate is consisting of a two-layer structure of a support layer and a dense layer, and is prepared by the following method:

Step a: Mixing the fiber materials of the support layer and the dense layer respectively with water in the defibizer according to the formulas shown in Table 1, defiberizing and beating to a solid weight percent concentration of 0.2 wt %, and then diluting by the flushing pump, wherein the fiber material of the support layer is diluted to a solid weight percent concentration of 0.02375 wt % to obtain Pulp 1; the fiber material of the dense layer is diluted to a solid weight percent concentration of 0.005 wt % to obtain Pulp 2.

Step b: Respectively feeding the pulp 1 and the pulp 2 obtained in step a into the HYDROFORMER™, a type of double-layer hydraulic inclined wire former, wherein the pulp 1 enters the lower flow channel at a flow rate of 740 m$^3$/h, the pulp 2 enters the upper flow channel at a flow rate of 185 m$^3$/h; after rectification, making papers of the two layers at the same time, and draining to obtain a wet paper sheet for the substrate.

Step c: Drying the wet paper sheet for the substrate obtained in step b to obtain a dry paper sheet for the substrate at a temperature of 120° C. by a Yankee dryer.

Step d: Calendering the dry paper sheet for the substrate obtained in Step c at a temperature of 190° C. by a metal roller and a soft roller to obtain the lithium ion battery separator substrate of the disclosure.

Preparation Examples 2-4, 35-40, 47, 48

A lithium ion battery separator substrate is consisting of a two-layer structure of a support layer and a dense layer. The formulas of the support layer and the dense layer are shown in Table 1. The preparation method is the same as that in Preparation Example 1.

Preparation Example 5

A lithium ion battery separator substrate is consisting of a two-layer structure of a support layer and a dense layer. The formulas of the support layer and the dense layer are shown in Table 1. The separator substrate is prepared by the following method:

Step a: Mixing the fiber materials of the support layer and the dense layer respectively with water in the defibizer according to the formulas shown in Table 1, defiberizing and beating to a solid weight percent concentration of 0.2 wt %, and then diluting by the flushing pump, wherein the fiber material of the support layer is diluted to a solid weight percent concentration of 0.02 wt % to obtain Pulp 1; the fiber material of the dense layer is diluted to a solid weight percent concentration of 0.02 wt % to obtain Pulp 2.

Step b: Respectively feeding the pulp 1 and the pulp 2 obtained in step a into the HYDROFORMER™, a type of double-layer hydraulic inclined wire former, wherein the pulp 1 enters the lower flow channel at a flow rate of 740 m$^3$/h, the pulp 2 enters the upper flow channel at a flow rate of 185 m$^3$/h; after rectification, making papers of the two layers at the same time, and draining to obtain a wet paper sheet for the substrate.

Step c: Drying the wet paper sheet for the substrate obtained in step b to obtain a dry paper sheet for the substrate at a temperature of 120° C. by a Yankee dryer.

Step d: Calendering the dry paper sheet for the substrate obtained in Step c at a temperature of 190° C. by a metal roller and a soft roller to obtain the lithium ion battery separator substrate of the present disclosure.

Preparation Examples 6-8, 13-15, 22-28, 41-44, 61-63

A lithium ion battery separator substrate is consisting of a two-layer structure of a support layer and a dense layer. The formulas of the support layer and the dense layer are shown in Table 1. The preparation method is the same as that in Preparation Example 5.

Preparation Example 9

A lithium ion battery separator substrate is consisting of a two-layer structure of a support layer and a dense layer. The formulas of the support layer and the dense layer are shown in Table 1. The separator substrate is prepared by the following method:

Step a: Mixing the fiber materials of the support layer and the dense layer respectively with water in the defibizer according to the formulas shown in Table 1, defiberizing and beating to a solid weight percent concentration of 0.2 wt %, and then diluting by the flushing pump, wherein the fiber material of the support layer is diluted to a solid weight percent concentration of 0.015 wt % to obtain Pulp 1; the fiber material of the dense layer is diluted to a solid weight percent concentration of 0.04 wt % to obtain Pulp 2.

Step b: Respectively feeding the pulp 1 and the pulp 2 obtained in step a to the HYDROFORMER™, a type of double-layer hydraulic inclined wire former, wherein the pulp 1 enters the lower flow channel at a flow rate of 740 m$^3$/h, the pulp 2 enters the upper flow channel at a flow rate of 185 m$^3$/h; after rectification, making papers of the two layers at the same time, and draining to obtain a wet paper sheet for the substrate.

Step c: Drying the wet paper sheet for the substrate obtained in step b to obtain a dry paper sheet for the substrate at a temperature of 120° C. by a Yankee dryer.

Step d: Calendering the dry paper sheet for the substrate obtained in Step c at a temperature of 190° C. by a metal roller and a soft roller to obtain the lithium ion battery separator substrate of the disclosure.

Preparation Examples 10-12, 29-34, 45-46

A lithium ion battery separator substrate is consisting of a two-layer structure of a support layer and a dense layer. The formulas of the support layer and the dense layer are shown in Table 1. The preparation method is the same as that in Preparation Example 9.

Preparation Examples 16, 19, 51-52, 55-56

A lithium ion battery separator substrate is consisting of a two-layer structure of a support layer and a dense layer. The formulas of the support layer and the dense layer are shown in Table 1. The separator substrate is prepared by the following method:

Step a and Step b are the same as in Preparation Example 5.

Step c: Drying the wet paper sheet for the substrate obtained in step b to obtain a dry paper sheet for the substrate at a temperature of 90° C. by a Yankee dryer.

Step d: Calendering the dry paper sheet for the substrate obtained in Step c at a temperature of 120° C. by a metal roller and a soft roller to obtain the lithium ion battery separator substrate of the disclosure.

Preparation Examples 17-18, 20-21, 59-60

A lithium ion battery separator substrate is consisting of a two-layer structure of a support layer and a dense layer. The formulas of the support layer and the dense layer are shown in Table 1. The separator substrate is prepared by the following method:

Step a and Step b are the same as in Preparation Example 9.

Step c: Drying the wet paper sheet for the substrate obtained in step b to obtain a dry paper sheet for the substrate at a temperature of 90° C. by a Yankee dryer.

Step d: Calendering the dry paper sheet for the substrate obtained in Step c at a temperature of 120° C. by a metal roller and a soft roller to obtain the lithium ion battery separator substrate of the disclosure.

Preparation Examples 49-50, 53-54, 57-58

A lithium ion battery separator substrate is consisting of a two-layer structure of a support layer and a dense layer. The formulas of the support layer and the dense layer are shown in Table 1. The separator substrate is prepared by the following method:

Step a and Step b are the same as in Preparation Example 1.

Step c: Drying the wet paper sheet for the substrate obtained in step b to obtain a dry paper sheet for the substrate at a temperature of 90° C. by a Yankee dryer.

Step d: Calendering the dry paper sheet for the substrate obtained in Step c at a temperature of 120° C. by a metal roller and a soft roller to obtain the lithium ion battery separator substrate of the disclosure.

Comparative Example 1

A lithium ion battery separator substrate is consisting of a single layer structure. The formula of the single layer is shown in Table 2. The separator substrate is prepared by the following method:

Step a: Mixing the fiber material with water in the defibizer according to the formula shown in Table 2, defiberizing and beating to a solid weight percent concentration of 0.2 wt %, and then diluting the fiber material by the flushing pump to a solid weight percent concentration of 0.02 wt % to obtain a pulp.

Step b: Feeding the pulp obtained in step a to an inclined wire paper machine, wherein the flow rate of the pulp is 925 m$^3$/h; after rectification, and draining to obtain a wet paper sheet for the substrate.

Step c: Drying the wet paper sheet for the substrate obtained in step b to obtain a dry paper sheet for the substrate at a temperature of 120° C. by a Yankee dryer.

Step d: Calendering the dry paper sheet for the substrate obtained in Step c at a temperature of 190° C. by a metal roller and a soft roller to obtain the single-layer lithium ion battery separator substrate.

Comparative Example 2

A lithium ion battery separator substrate is consisting of a single layer structure. The formula of the single layer is shown in Table 2. The preparation method is the same as that in Comparative Example 1.

Comparative Examples 3-5

A lithium ion battery separator substrate is consisting of a two-layer structure of a support layer and a dense layer. The formulas of the support layer and the dense layer are shown in Table 2. The preparation method is the same as that in Preparation Example 5.

Comparative Examples 6-7

A lithium ion battery separator substrate is consisting of a two-layer structure of a support layer and a dense layer. The formulas of the support layer and the dense layer are shown in Table 2. The preparation method is the same as that in Preparation Example 1.

Comparative Example 8

A lithium ion battery separator substrate is consisting of a two-layer structure of a support layer and a dense layer, and is prepared by the following method:

Step a: Mixing the fiber materials of the support layer and the dense layer respectively with water in the defibizer according to the formulas shown in Table 2, defiberizing and beating to a solid weight percent concentration of 0.2 wt %, and then diluting by the flushing pump, wherein the fiber material of the support layer is diluted to a solid weight percent concentration of 0.0125 wt % to obtain Pulp 1; the fiber material of the dense layer is diluted to a solid weight percent concentration of 0.05 wt % to obtain Pulp 2.

Step b, step c and step d are the same as in Preparation Example 1.

Comparative Examples 9-10

A lithium ion battery separator substrate is consisting of a two-layer structure of a support layer and a dense layer. The formulas of the support layer and the dense layer are shown in Table 2. The separator substrate is prepared by the following method:

Step a and step b are the same as in Preparation Example 5.

Step c: Drying the wet paper sheet for the substrate obtained in step b to obtain a dry paper sheet for the substrate at a temperature of 90° C. by a Yankee dryer.

Step d: Calendering the dry paper sheet for the substrate obtained in Step c at a temperature of 120° C. by a metal roller and a soft roller to obtain the lithium ion battery separator substrate of the disclosure.

Comparative Example 11

The preparing process is performed according to the method diclosed in Chinese Patent CN201410496299.4. It discloses a substrate for separators for lithium secondary batteries which is prepared by the following method: Using a disc mill, mix solvent-spun cellulose fibers 10% by mass, oriented crystalline polyethylene terephthalate (PET) short fibers 50% by mass and unstretched binder polyester fibers 40% by mass together, wherein the solvent-spun cellulose fibers have an average fiber diameter of 10 μm, a fiber length of 4 mm, and a freeness of 97 ml; the oriented crystalline polyethylene terephthalate (PET) short fibers have an average fiber diameter of 2.4 μm and fiber length of 3 mm; unstretched binder polyester fibers have an average fiber diameter of 4.4 μm and fiber length of 3 mm; and then dissociate in the pulp machine water to obtain a uniform papermaking pulp (0.3 mass % concentration) on the basis of agitation using an agitator. The oblique short wire is used as the first layer and the rotary wire is used as the second layer, and the weight ratio of the oblique short wire to the rotary wire is set to 50:50 to laminate the papermaking pulp to obtain a wet sheet. After drying at a Yankee dryer temperature of 130° C., calender by a metal roller and an elastic roller with a surface temperature of 195° C. to obtain a weight per unit area of 8.2 g/m² and a thickness of 14.2 μm of the substrate for separators for lithium secondary batteries.

TABLE 1

Fiber formulation of Preparation Examples 1-63 (wt %)

| Preparation Examples | | Superfine main fibers | Thermoplastic bonded fibers | Nanofibers (the first nanofibers or the second nanofibers) | Proportion based on the total basis weight |
|---|---|---|---|---|---|
| Preparation Example 1 | Support layer | 45% [a] | 40% [d] | 15% [i] | 95% |
| | Dense layer | — | — | 100% [j] | 5% |
| Preparation Example 2 | Support layer | 30% [a] | 65% [d] | 5% [i] | 95% |
| | Dense layer | — | — | 100% [j] | 5% |
| Preparation Example 3 | Support layer | 65% [a] | 30% [d] | 5% [i] | 95% |
| | Dense layer | — | — | 100% [j] | 5% |
| Preparation Example 4 | Support layer | 40% [a] | 30% [d] | 30% [i] | 95% |
| | Dense layer | — | — | 100% [j] | 5% |
| Preparation Example 5 | Support layer | 45% [a] | 40% [d] | 15% [i] | 80% |
| | Dense layer | — | — | 100% [j] | 20% |
| Preparation Example 6 | Support layer | 30% [a] | 65% [d] | 5% [i] | 80% |
| | Dense layer | — | — | 100% [j] | 20% |
| Preparation Example 7 | Support layer | 65% [a] | 30% [d] | 5% [i] | 80% |
| | Dense layer | — | — | 100% [j] | 20% |
| Preparation Example 8 | Support layer | 40% [a] | 30% [d] | 30% [i] | 80% |
| | Dense layer | — | — | 100% [j] | 20% |
| Preparation Example 9 | Support layer | 45% [a] | 40% [d] | 15% [i] | 60% |
| | Dense layer | — | — | 100% [j] | 40% |
| Preparation Example 10 | Support layer | 30% [a] | 65% [d] | 5% [i] | 60% |
| | Dense layer | — | — | 100% [j] | 40% |
| Preparation Example 11 | Support layer | 65% [a] | 30% [d] | 5% [i] | 60% |
| | Dense layer | — | — | 100% [j] | 40% |
| Preparation Example 12 | Support layer | 40% [a] | 30% [d] | 30% [i] | 60% |
| | Dense layer | — | — | 100% [j] | 40% |
| Preparation Example 13 | Support layer | 30% [b] | 65% [d] | 5% [i] | 80% |
| | Dense layer | — | — | 100% [j] | 20% |
| Preparation Example 14 | Support layer | 30% [c] | 65% [d] | 5% [i] | 80% |
| | Dense layer | — | — | 100% [j] | 20% |
| Preparation Example 15 | Support layer | 10% [a] 10% [b] 10% [c] | 65% [d] | 5% [i] | 80% |
| | Dense layer | — | — | 100% [j] | 20% |
| Preparation Example 16 | Support layer | 40% [a] | 30% [e] | 30% [i] | 80% |
| | Dense layer | — | — | 100% [j] | 20% |
| Preparation Example 17 | Support layer | 30% [a] | 65% [e] | 5% [i] | 60% |
| | Dense layer | — | — | 100% [j] | 40% |
| Preparation Example 18 | Support layer | 40% [a] | 30% [e] | 30% [i] | 60% |
| | Dense layer | — | — | 100% [j] | 40% |
| Preparation Example 19 | Support layer | 40% [a] | 30% [f] | 30% [i] | 80% |
| | Dense layer | — | — | 100% [j] | 20% |
| Preparation Example 20 | Support layer | 30% [a] | 65% [f] | 5% [i] | 60% |
| | Dense layer | — | — | 100% [j] | 40% |
| Preparation Example 21 | Support layer | 40% [a] | 30% [f] | 30% [i] | 60% |
| | Dense layer | — | — | 100% [j] | 40% |
| Preparation Example 22 | Support layer | 30% [a] | 65% [d] | 5% [j] | 80% |
| | Dense layer | — | — | 100% [i] | 20% |
| Preparation Example 23 | Support layer | 30% [a] | 65% [d] | 5% [i] | 80% |
| | Dense layer | — | — | 100% [i] | 20% |
| Preparation Example 24 | Support layer | 30% [a] | 65% [d] | 5% [i] | 80% |
| | Dense layer | — | — | 50% [i] 50% [j] | 20% |
| Preparation Example 25 | Support layer | 30% [a] | 65% [d] | 5% [g] | 80% |
| | Dense layer | — | — | 100% [h] | 20% |
| Preparation Example 26 | Support layer | 45% [b] | 40% [d] | 15% [i] | 80% |
| | Dense layer | — | — | 100% [j] | 20% |
| Preparation Example 27 | Support layer | 45% [c] | 40% [d] | 15% [i] | 80% |
| | Dense layer | — | — | 100% [j] | 20% |

TABLE 1-continued

Fiber formulation of Preparation Examples 1-63 (wt %)

| Preparation Examples | | Superfine main fibers | Thermoplastic bonded fibers | Nanofibers (the first nanofibers or the second nanofibers) | Proportion based on the total basis weight |
|---|---|---|---|---|---|
| Preparation Example 28 | Support layer | 12% [a)]<br>12% [b)]<br>11% [c)] | 40% [d)] | 15% [i)] | 80% |
| | Dense layer | — | — | 100% [j)] | 20% |
| Preparation Example 29 | Support layer | 30% [b)] | 65% [d)] | 5% [i)] | 60% |
| | Dense layer | — | — | 100% [j)] | 40% |
| Preparation Example 30 | Support layer | 30% [c)] | 65% [d)] | 5% [i)] | 60% |
| | Dense layer | — | — | 100% [j)] | 40% |
| Preparation Example 31 | Support layer | 10% [a)]<br>10% [b)]<br>10% [c)] | 65% [d)] | 5% [i)] | 60% |
| | Dense layer | — | — | 100% [j)] | 40% |
| Preparation Example 32 | Support layer | 45% [b)] | 40% [d)] | 15% [i)] | 60% |
| | Dense layer | — | — | 100% [j)] | 40% |
| Preparation Example 33 | Support layer | 45% [c)] | 40% [d)] | 15% [i)] | 60% |
| | Dense layer | — | — | 100% [j)] | 40% |
| Preparation Example 34 | Support layer | 12% [a)]<br>12% [b)]<br>11% [c)] | 40% [d)] | 15% [i)] | 60% |
| | Dense layer | — | — | 100% [j)] | 40% |
| Preparation Example 35 | Support layer | 30% [b)] | 65% [d)] | 5% [i)] | 95% |
| | Dense layer | — | — | 100% [j)] | 5% |
| Preparation Example 36 | Support layer | 30% [c)] | 65% [d)] | 5% [i)] | 95% |
| | Dense layer | — | — | 100% [j)] | 5% |
| Preparation Example 37 | Support layer | 10% [a)]<br>10% [b)]<br>10% [c)] | 65% [d)] | 5% [i)] | 95% |
| | Dense layer | — | — | 100% [j)] | 5% |
| Preparation Example 38 | Support layer | 45% [b)] | 40% [d)] | 15% [i)] | 95% |
| | Dense layer | — | — | 100% [j)] | 5% |
| Preparation Example 39 | Support layer | 45% [c)] | 40% [d)] | 15% [i)] | 95% |
| | Dense layer | — | — | 100% [j)] | 5% |
| Preparation Example 40 | Support layer | 12% [a)]<br>12% [b)]<br>11% [c)] | 40% [d)] | 15% [i)] | 95% |
| | Dense layer | — | — | 100% [j)] | 5% |
| Preparation Example 41 | Support layer | 45% [a)] | 40% [d)] | 15% [j)] | 80% |
| | Dense layer | — | — | 100% [i)] | 20% |
| Preparation Example 42 | Support layer | 45% [a)] | 40% [d)] | 15% [g)] | 80% |
| | Dense layer | — | — | 100% [h)] | 20% |
| Preparation Example 43 | Support layer | 45% [a)] | 40% [d)] | 15% [i)] | 80% |
| | Dense layer | — | — | 100% [j)] | 20% |
| Preparation Example 44 | Support layer | 45% [a)] | 40% [d)] | 15% [i)] | 80% |
| | Dense layer | — | — | 50% [i)]<br>50% [j)] | 20% |
| Preparation Example 45 | Support layer | 30% [a)] | 65% [d)] | 5% [i)] | 60% |
| | Dense layer | — | — | 100% [i)] | 40% |
| Preparation Example 46 | Support layer | 30% [a)] | 65% [d)] | 5% [i)] | 60% |
| | Dense layer | — | — | 50% [i)]<br>50% [j)] | 40% |
| Preparation Example 47 | Support layer | 30% [a)] | 65% [d)] | 5% [i)] | 95% |
| | Dense layer | — | — | 100% [i)] | 5% |
| Preparation Example 48 | Support layer | 30% [a)] | 65% [d)] | 5% [i)] | 95% |
| | Dense layer | — | — | 50% [i)]<br>50% [j)] | 5% |
| Preparation Example 49 | Support layer | 40% [a)] | 30% [e)] | 30% [i)] | 95% |
| | Dense layer | — | — | 100% [j)] | 5% |
| Preparation Example 50 | Support layer | 40% [a)] | 30% [f)] | 30% [i)] | 95% |
| | Dense layer | — | — | 100% [j)] | 5% |
| Preparation Example 51 | Support layer | 30% [a)] | 65% [e)] | 5% [i)] | 80% |
| | Dense layer | — | — | 100% [j)] | 20% |
| Preparation Example 52 | Support layer | 30% [a)] | 65% [f)] | 5% [i)] | 80% |
| | Dense layer | — | — | 100% [j)] | 20% |
| Preparation Example 53 | Support layer | 30% [a)] | 65% [e)] | 5% [i)] | 95% |
| | Dense layer | — | — | 100% [j)] | 5% |
| Preparation Example 54 | Support layer | 30% [a)] | 65% [f)] | 5% [i)] | 95% |
| | Dense layer | — | — | 100% [j)] | 5% |
| Preparation Example 55 | Support layer | 45% [a)] | 40% [e)] | 15% [i)] | 80% |
| | Dense layer | — | — | 100% [j)] | 20% |
| Preparation Example 56 | Support layer | 45% [a)] | 40% [f)] | 15% [i)] | 80% |
| | Dense layer | — | — | 100% [j)] | 20% |
| Preparation Example 57 | Support layer | 45% [a)] | 40% [e)] | 15% [i)] | 95% |
| | Dense layer | — | — | 100% [j)] | 5% |
| Preparation Example 58 | Support layer | 45% [a)] | 40% [f)] | 15% [i)] | 95% |
| | Dense layer | — | — | 100% [j)] | 5% |
| Preparation Example 59 | Support layer | 45% [a)] | 40% [e)] | 15% [i)] | 60% |
| | Dense layer | — | — | 100% [j)] | 40% |
| Preparation Example 60 | Support layer | 45% [a)] | 40% [f)] | 15% [i)] | 60% |
| | Dense layer | — | — | 100% [j)] | 40% |
| Preparation Example 61 | Support layer | 45% [a)] | 40% [d)] | 15% [i)]<br>20% [i)] | 80%<br>20% |
| | Dense layer | | | 80% [j)] | |

TABLE 1-continued

Fiber formulation of Preparation Examples 1-63 (wt %)

| Preparation Examples | | Superfine main fibers | Thermoplastic bonded fibers | Nanofibers (the first nanofibers or the second nanofibers) | Proportion based on the total basis weight |
|---|---|---|---|---|---|
| Preparation Example 62 | Support layer | 45% a) | 40% d) | 15% i) | 80% |
| | Dense layer | — | — | 100% k) | 20% |
| Preparation Example 63 | Support layer | 45% a) | 40% d) | 15% k) | 80% |
| | Dense layer | — | — | 100% l) | 20% |

Note:
a) Stretched PET fiber with a fiber diameter of 2 μm and a fiber length of 3 mm;
b) PAN fiber with a fiber diameter of 2 μm and a fiber length of 3 mm;
c) PA fiber with a fiber diameter of 2 μm and a fiber length of 3 mm;
d) Unstretched PET fiber with a fiber diameter of 4 μm and a fiber length of 3 mm;
e) PET/co-PET bi-component fiber with a fiber diameter of 4 μm and a fiber length of 3 mm;
f) PP/PE bi-component fiber with a fiber diameter of 4 μm and a fiber length of 3 mm;
g) Fibrillated Tencel nanofiber with a beating degree of 70° SR, Lenzing, Austria;
h) Fibrillated PPTA nanofiber with a beating degree of 60° SR, DuPont Kevlar of the United States;
i) Fibrillated Tencel nanofiber with a beating degree of 95° SR, Lenzing, Austria;
j) Fibrillated PPTA nanofiber with a beating degree of 85° SR, DuPont Kevlar of the United States;
k) Fibrillated PBO nanofiber with a beating degree of 85° SR, Japan Toyobo Company;
l) Fibrillated PAN nanofiber with a beating degree of 85° SR.

TABLE 2

Fiber formulas (wt %) of Comparative Examples 1-10

| Comparative Examples | | Superfine main fibers | Thermoplastic bonded fibers | Nanofibers | Proportion based on the total basis weight |
|---|---|---|---|---|---|
| Comparative Example 1 | Single-layer | 50% a) | 50% b) | — | 100% |
| Comparative Example 2 | Single-layer | 45% a) | 40% b) | 15% e) | 100% |
| Comparative Example 3 | Support layer | 45% a) | 40% b) | 15% e) | 80% |
| | Dense layer | 20% a) | — | 80% f) | 20% |
| Comparative Example 4 | Support layer | 50% a) | 50% b) | — | 80% |
| | Dense layer | — | — | 100% f) | 20% |
| Comparative Example 5 | Support layer | 75% a) | 20% b) | 5% e) | 80% |
| | Dense layer | — | — | 100% f) | 20% |
| Comparative Example 6 | Support layer | 30% a) | 30% b) | 40% e) | 95% |
| | Dense layer | — | — | 100% f) | 5% |
| Comparative Example 7 | Support layer | 30% a) | 30% b) | 40% f) | 95% |
| | Dense layer | — | — | 100% f) | 5% |
| Comparative Example 8 | Support layer | 45% a) | 40% b) | 15% e) | 50% |
| | Dense layer | — | — | 100% f) | 50% |
| Comparative Example 9 | Support layer | 75% a) | 20% e) | 5% e) | 80% |
| | Dense layer | — | — | 100% f) | 20% |
| Comparative Example 10 | Support layer | 75% a) | 20% d) | 5% e) | 80% |
| | Dense layer | — | — | 100% f) | 20% |

Note:
a) Stretched PET fiber with a fiber diameter of 2 μm and a fiber length of 3 mm;
b) Unstretched PET fiber with a fiber diameter of 4 μm and a fiber length of 3 mm;
c) PET/co-PET bi-component fiber with a fiber diameter of 4 μm and a fiber length of 3 mm;
d) PP/PE bi-component fiber with a fiber diameter of 4 μm and a fiber length of 3 mm;
e) Fibrillated Tencel nanofiber with a beating degree of 95° SR, Lenzing, Austria;
f) Fibrillated PPTA nanofiber with a beating degree of 85° SR, DuPont Kevlar of the United States.

Note:
a) Stretched PET fiber with a fiber diameter of 2 μm and a fiber length of 3 mm;
b) PAN fiber with a fiber diameter of 2 μm and a fiber length of 3 mm;
c) PA fiber with a fiber diameter of 2 μm and a fiber length of 3 mm;
d) Unstretched PET fiber with a fiber diameter of 4 μm and a fiber length of 3 mm;
e) PET/co-PET bi-component fiber with a fiber diameter of 4 μm and a fiber length of 3 mm;
f) PP/PE bi-component fiber with a fiber diameter of 4 μm and a fiber length of 3 mm;
g) Fibrillated lyocell nanofiber with a beating degree of 70° SR, Lenzing, Austria;
h) Fibrillated PPTA nanofiber with a beating degree of 60° SR, DuPont Kevlar of the United States;
i) Fibrillated lyocell nanofiber with a beating degree of 95° SR, Lenzing, Austria;
j) Fibrillated PPTA nanofiber with a beating degree of 85° SR, DuPont Kevlar of the United States;
k) Fibrillated PBO nanofiber with a beating degree of 85° SR, Japan Toyobo Company; 1) Fibrillated PAN nanofiber with a beating degree of 85° SR.

Note:
a) Stretched PET fiber with a fiber diameter of 2 μm and a fiber length of 3 mm;
b) Unstretched PET fiber with a fiber diameter of 4 μm and a fiber length of 3 mm;
c) PET/co-PET bi-component fiber with a fiber diameter of 4 μm and a fiber length of 3 mm;
d) PP/PE bi-component fiber with a fiber diameter of 4 μm and a fiber length of 3 mm;
e) Fibrillated lyocell nanofiber with a beating degree of 95° SR, Lenzing, Austria;
f) Fibrillated PPTA nanofiber with a beating degree of 85° SR, DuPont Kevlar of the United States.

Preparation of the Lithium Ion Battery Separator

The pulp of the inorganic coating is prepared according to the inorganic coating formulation shown in Table 3.

The method for preparing the pulp of the inorganic coating is: sequentially adding the dispersants and the water-retaining agents to the deionized water and stirring; adding the inorganic particles and dispersing at 2500 r/min for 30 min, and filtering to obtain a dispersion liquid through a strainer of 320 mesh; adding the adhesive resins to the dispersion liquid, and continuing to uniformly disperse for 15 min to obtain the pulp of the inorganic coating, wherein the pulp of the inorganic coating prepared has a solid content of 50 wt %.

TABLE 3

Formulation of the inorganic coating (wt %)

| Formulation | Inorganic particles | Dispersants | Water-Retaining Agents | Adhesive Resins |
|---|---|---|---|---|
| 1 | 84% alumina | 1% ammonium polycarboxylate | 2% CMC | 13% acrylate |
| 2 | 84% silica | 1% ammonium polycarboxylate | 2% CMC | 13% acrylate |
| 3 | 84% boehmite | 1% ammonium polycarboxylate | 2% CMC | 13% acrylate |
| 4 | 84% magnesium hydroxide | 1% ammonium polycarboxylate | 2% CMC | 13% styrene-butadiene latex |
| 5 | 80% alumina | 2% ammonium polycarboxylate | 4% CMC | 14% acrylate |
| 6 | 87% alumina | 2% ammonium polycarboxylate | 0.5% CMC | 10.5% acrylate |
| 7 | 80% alumina | 0.5% ammonium polycarboxylate | 2.5% CMC | 17% acrylate |
| 8 | 85% alumina | 1.5% ammonium polycarboxylate | 3.5% CMC | 10% acrylate |
| 9 | 42% alumina + 42% magnesium hydroxide | 1% ammonium polycarboxylate | 2% CMC | 13% acrylate |

Figure 1:
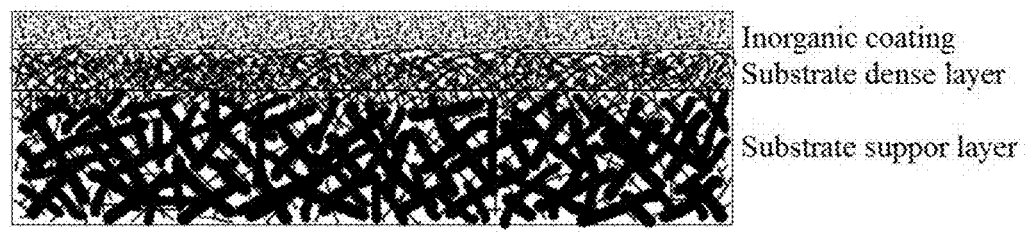
FIG. 1 is a schematic diagram of the apparent morphology of a lithium ion battery separator prepared by the disclosure.

The pulp obtained according to formulation 1-9 is respectively coated on the surface of the dense layer of the lithium ion battery separator substrate of Preparation Examples 1-63, with coating weight of 8 g/m², and then which is dried by hot air (120° C.) to obtain the lithium ion battery separator of the disclosure. The appearance of the lithium ion battery separator prepared by the disclosure is shown in FIG. 1.

Performance Test of the Lithium Ion Battery Separator

The pulp of the inorganic coating prepared according to the formulation 1 of the inorganic coating was coated on the lithium ion battery separator substrate prepared in Preparation Examples 1-12, 22-25, 41-48, 61-63 and Comparative Examples 1-11 to obtain the lithium ion battery separators corresponding to Examples 1-12, 22-25, 41-48, 61-63 and Comparative Examples 1'-11', respectively, for performance testing. The test items and methods are as follows:

1. Basis weight, thickness and tensile strength: measured by TAPPI standard.

2. Average pore size and maximum pore size: measured using a PMI pore size analyzer.

3. Heat shrinkage rate

The dimensional stability of the separator at a certain temperature can be characterized by the thermal stability of the separator, usually expressed in heat shrinkage rate. Test of the heat shrinkage rate of the separator as follows:

Cutting the separator into squares with side length Lb, and then respectively placing the separator in an environment of 110° C. and 300° C. for 1 hour, testing the side length $L_a$ of the separator, and calculating the shrinkage rate according to the following formula:

Shrinkage rate (%)=$(L_b-L_a)/L_b \times 100$

4. Separator strength retention

The separator was placed in a 300° C. environment for 1 hour and taken out. The strength retention of the separator was evaluated according to the following criteria:

○: Fold the separator 10 times without breaking;
Δ: Fold the separator 2-10 times and break;
x: Fold the separator once and break.

TABLE 4

Performance test parameters of the lithium ion battery separator of the disclosure

| Parameters | Basis Weight g/m² | Thickness μm | Tensile Strength N/m | Average Pore Size μm | Maximum Pore Size μm | Heat Shrinkage Rate % at 300° C. | Strength Retention |
|---|---|---|---|---|---|---|---|
| Example 1 | 19.9 | 25.3 | 1145 | 0.28 | 0.86 | 1.7 | Δ |
| Example 2 | 20.2 | 25.8 | 1372 | 0.36 | 0.95 | 1.8 | Δ |
| Example 3 | 20.0 | 25.9 | 903 | 0.34 | 0.92 | 1.8 | Δ |
| Example 4 | 20.0 | 24.5 | 888 | 0.25 | 0.80 | 1.7 | Δ |
| Example 5 | 20.2 | 24.7 | 1042 | 0.26 | 0.82 | 1.2 | ○ |
| Example 6 | 20.2 | 25.1 | 1271 | 0.28 | 0.85 | 1.4 | ○ |
| Example 7 | 19.9 | 25.2 | 843 | 0.28 | 0.84 | 1.3 | ○ |
| Example 8 | 20.2 | 23.9 | 810 | 0.22 | 0.68 | 1.2 | ○ |
| Example 9 | 19.7 | 23.8 | 780 | 0.20 | 0.66 | 1.0 | ○ |
| Example 10 | 20.2 | 24.1 | 985 | 0.22 | 0.68 | 1.0 | ○ |
| Example 11 | 19.8 | 24.2 | 750 | 0.21 | 0.67 | 1.0 | ○ |
| Example 12 | 20.1 | 23.3 | 730 | 0.16 | 0.60 | 0.8 | ○ |
| Example 22 | 20.1 | 25.2 | 1233 | 0.28 | 0.86 | 1.4 | Δ |
| Example 23 | 20.2 | 25.1 | 1275 | 0.28 | 0.85 | 1.5 | Δ |
| Example 24 | 20.0 | 25.3 | 1254 | 0.28 | 0.85 | 1.4 | Δ |
| Example 25 | 19.8 | 25.1 | 1226 | 0.28 | 0.87 | 1.4 | ○ |
| Example 41 | 19.9 | 24.6 | 1018 | 0.26 | 0.82 | 1.2 | Δ |
| Example 42 | 20.2 | 24.8 | 1042 | 0.26 | 0.83 | 1.3 | ○ |
| Example 43 | 20.1 | 24.7 | 1032 | 0.26 | 0.82 | 1.4 | Δ |
| Example 44 | 19.8 | 24.6 | 1135 | 0.26 | 0.82 | 1.2 | Δ |
| Example 45 | 19.9 | 24.2 | 1004 | 0.21 | 0.67 | 1.0 | Δ |
| Example 46 | 20.1 | 24.3 | 996 | 0.21 | 0.67 | 1.0 | Δ |
| Example 47 | 20.1 | 25.9 | 1387 | 0.34 | 0.92 | 2.0 | Δ |
| Example 48 | 19.8 | 25.8 | 1356 | 0.34 | 0.93 | 1.8 | Δ |

TABLE 4-continued

Performance test parameters of the lithium ion battery separator of the disclosure

| Parameters | Basis Weight g/m² | Thickness μm | Tensile Strength N/m | Average Pore Size μm | Maximum Pore Size μm | Heat Shrinkage Rate % at 300° C. | Strength Retention |
|---|---|---|---|---|---|---|---|
| Example 61 | 20.1 | 24.6 | 996 | 0.25 | 0.81 | 1.3 | ○ |
| Example 62 | 20.0 | 24.7 | 975 | 0.26 | 0.82 | 1.2 | ○ |
| Example 63 | 19.9 | 25.3 | 970 | 0.26 | 0.83 | 1.2 | Δ |

Note:
The lithium ion battery separator of the disclosure has a heat shrinkage rate of zero at 110° C., and shrinkage only begins when it is close to 300° C.

TABLE 5

Performance test parameters of the lithium ion battery separator

| Parameters | Basis Weight g/m² | Thickness μm | Tensile Strength N/m | Average Pore Size μm | Maximum Pore Size μm | Heat Shrinkage Rate % at 300° C. | Strength Retention |
|---|---|---|---|---|---|---|---|
| Comparative Example 1' | 19.8 | 26.3 | 1383 | 0.84 | 25.3 | Melting | x |
| Comparative Example 2' | 20.2 | 25.5 | 1232 | 0.65 | 4.52 | 5.0 | Δ |
| Comparative Example 3' | 20.1 | 24.8 | 1178 | 0.36 | 2.26 | 3.5 | ○ |
| Comparative Example 4' | 20.1 | 25.3 | 1094 | 0.34 | 2.13 | 1.2 | ○ |
| Comparative Example 5' | 19.9 | 25.1 | 514 | 0.28 | 0.85 | 1.2 | ○ |
| Comparative Example 6' | 19.8 | 23.9 | 565 | 0.26 | 0.82 | 1.8 | Δ |
| Comparative Example 7' | 19.9 | 23.9 | 550 | 0.26 | 0.83 | 1.8 | Δ |
| Comparative Example 8' | 20.2 | 23.4 | 523 | 0.18 | 0.62 | 1.0 | ○ |
| Comparative Example 9' | 19.8 | 25.1 | 482 | 0.28 | 0.85 | 1.2 | ○ |
| Comparative Example 10' | 19.9 | 25.1 | 673 | 0.28 | 0.85 | 1.2 | ○ |
| Comparative Example 11' | 15.9 | 20.1 | 937 | 0.75 | 5.54 | 10.0 | Δ |

It can be seen from Table 4 that the lithium ion battery separators obtained in Examples 1-12, 22-25, 41-48 and 61-63 of the disclosure are consisted of the lithium ion battery separator substrate of the disclosure and an inorganic coating. Compared with the prior art battery separators, the lithium ion battery separator of the disclosure has a heat shrinkage rate of zero at 110° C. with excellent strength retention and excellent heat stability. The heat shrinkage rate at 300° C. for 1 h is no more than 2%, the maximum pore diameter is less than 1 μm, and the strength is greater than 700 N/m.

It can be seen from Table 5 that in Comparative Example 1', the separator prepared by the single-layer substrate only made of PET fibers has pinholes, wherein the pore size is too large, and melting occurs at 300° C.; in Comparative Example 2', the separator prepared by the single-layer substrate made of PET fibers and fibrillated lyocell nanofibers has pinholes with too large pore size, the heat shrinkage rate of the separator is 5.0% after treatment at 300° C. for 1 h, and the separator is damaged after folding; in Comparative Example 3', the separator with double-layer substrate is made by a HYDROFORMER™, a type of double-layer hydraulic inclined wire former, and the dense layer of the separator is added with 20% stretched PET fibers and 70% fibrillated PPTA fibers, so that the separator has a heat shrinkage rate of 3.5% after treatment at 300° C. for 1 hour; in Comparative Example 4', the support layer does not use nanofibers, which causes the maximum pore diameter of the separator to be too large; in Comparative Examples 5'-10', the separator strength cannot meet the requirements; in Comparative Example 11', due to the substrate with large pores, the maximum pore diameter of the separator is too large, and there is no double-layer structure, the heat shrinkage rate is 10.0% after treatment at 300° C. for 1 hour.

In addition, according to the performance test method described above, the disclosure verifies the performance parameters of the lithium ion battery separator, wherein the separator is obtained by respectively coating the inorganic coatings of different formulation compositions (shown in Table 3) on the lithium ion battery separator substrates prepared in Preparation Examples 1-63 of the disclosure. Below, only performance parameters of the lithium ion battery separators (Examples 10, 64-71) are shown, wherein the separators are respectively obtained by coating the pulp of the inorganic coating of the formulation shown in Table 3 on the substrate of Preparation Example 10 as an example. The results are shown in Table 6:

TABLE 6

Performance test parameters of the lithium ion battery separator

| Parameters | Basis Weight g/m² | Thickness μm | Tensile Strength N/m | Average Pore Size μm | Maximum Pore Size μm | Heat Shrinkage Rate % at 300° C. | Strength Retention |
|---|---|---|---|---|---|---|---|
| Example 10 (Formulation 1) | 20.2 | 23.1 | 985 | 0.22 | 0.68 | 1.0 | ○ |
| Example 64 (Formulation 2) | 20.3 | 23.3 | 954 | 0.25 | 0.8 | 1.0 | ○ |
| Example 65 (Formulation 3) | 20.1 | 23.2 | 934 | 0.26 | 0.82 | 1.0 | ○ |
| Example 66 (Formulation 4) | 19.8 | 23.2 | 958 | 0.24 | 0.78 | 1.0 | ○ |
| Example 67 (Formulation 5) | 19.9 | 22.7 | 1003 | 0.26 | 0.82 | 1.4 | ○ |
| Example 68 (Formulation 6) | 20.2 | 22.9 | 978 | 0.34 | 0.92 | 1.0 | ○ |
| Example 69 (Formulation 7) | 20.3 | 23.2 | 1026 | 0.24 | 0.78 | 1.4 | ○ |
| Example 70 (Formulation 8) | 20.1 | 23.3 | 969 | 0.36 | 0.96 | 1.0 | ○ |
| Example 71 (Formulation 9) | 20.1 | 23.3 | 965 | 0.23 | 0.75 | 1.0 | ○ |

It should be understood that the disclosure described herein is not limited to specific methodologies, experimental protocols, or reagents, as these may vary. The discussion and examples provided herein are presented to describe specific embodiments and are not intended to limit the scope of the disclosure, which is limited only by the claims.

What is claimed is:

1. A method of preparing a lithium ion battery separator, comprising:
    mixing fiber materials of a support layer and a nano layer respectively with water, and then each independently defiberizing, beating and mixing to obtain pulps, and then diluting the pulps with water by a flushing pump to an on-wire concentration;
    feeding the diluted pulps of the support layer and the nano layer into a double-layer hydraulic inclined wire former, wherein the pulp of the nano layer enters an upper flow channel and the pulp of the support layer enters a lower flow channel, overlapping the pulp in each flow channel in the same area and making papers at the same time, and draining to obtain a wet paper sheet, forming the wet paper sheet for a substrate;
    drying the wet paper sheet for the substrate to obtain a dry paper sheet for the substrate by a Yankee dryer;
    calendering the dry paper sheet for the substrate by a metal roller and a soft roller to obtain the substrate; and
    coating an inorganic coating uniformly on the surface of the nano layer of the substrate, and then drying by hot air to obtain the lithium ion battery separator; wherein, the temperature of the hot air is 80-150° C.;
    wherein the inorganic coating comprises inorganic particles, dispersants, water-retaining agents and adhesive resins; the inorganic particles are selected from one or more of the group consisting of alumina, silica, boehmite and magnesium hydroxide; the dispersants are ammonium polycarboxylate; the water-retaining agents are sodium carboxymethyl cellulose (CMC); and the adhesive resins are acrylate or styrene-butadiene latex;
    wherein the inorganic coating comprises 80-85 wt % of the inorganic particles, 1-2 wt % of the dispersants, 2-4 wt % of the water-retaining agents and 10-14 wt % of the adhesive resins;
    wherein the substrate comprises 50-95 wt % of the support layer and 5-50 wt % of the nano layer, based on a total basis weight; the support layer consists of 30-45 wt % of superfine main fibers, 30-65 wt % of thermoplastic bonded fibers and 5-30 wt % of first nanofibers by weight; the nano layer consists of second nanofibers;
    wherein the first nanofibers and the second nanofibers are independently selected from one or more of the group consisting of fibrillated poly-p-phenylene terephthalamide (PPTA) nanofibers, fibrillated lyocell nanofibers, fibrillated poly-p-phenylene benzodioxazole (PBO) nanofibers, fibrillated polyacrylonitrile (PAN) nanofibers, polyimide (PI) nanofibers and nanocellulose fibers;
    wherein a coating weight of the inorganic coating is 3-15 g/m².

2. The preparation method according to claim 1, wherein a thickness of the substrate is 10-25 μm; a basis weight of the substrate is 8-17 g/m²; an average pore size of the substrate is less than 3 μm; and a maximum pore size of the substrate is less than 5 μm.

3. The preparation method according to claim 1, wherein the inorganic particles have a particle size of less than 3 μm; the ammonium polycarboxylate has a viscosity less than 100 mPa·s; the sodium carboxymethyl cellulose has a viscosity between 10 mPa·s and 50 mPa·s; and the adhesive resins have a viscosity less than 1000 mPa·s.

4. The preparation method according to claim 1, wherein the second nanofibers are fibrillated poly-p-phenylene terephthalamide (PPTA) nanofibers and fibrillated lyocell nanofibers; a ratio of the fibrillated poly-p-phenylene terephthalamide (PPTA) nanofibers to fibrillated lyocell nanofibers is 1:(1-4) by weight.

5. The preparation method according to claim 1, wherein a thickness of the separator is less than 30 μm; a basis weight of the separator is 15-29 g/m²; an average pore size of the separator is less than 0.6 μm; a maximum pore size of the separator is no more than 1.0 μm; and a heat shrinkage rate of the separator is no more than 2% at 300° C.

6. The preparation method according to claim 1, wherein the superfine main fibers have a fiber diameter of 0.1-6 μm; the superfine main fibers have a fiber length of 1-6 mm;

the thermoplastic bonded fibers have a fiber diameter of 0.1-8 μm; the thermoplastic bonded fibers have a fiber length of 1-6 mm; and the first nanofibers and the second nanofibers have a beating degree of 60-95° SR.

7. The preparation method according to claim 1, wherein, the solid weight percent concentrations of the pulp of the support layer and the nano layer are both 0.2 wt % before diluting with water; the on-wire concentration of the pulp of the support layer is 0.01-0.05 wt %; the on-wire concentration of the pulp of the nano layer is 0.002-0.05 wt %;

the flow rate of the pulp of the support layer is 160-3000 m$^3$/h; the flow rate of the pulp of the nano layer is 40-750 m$^3$/h;

a drying temperature is 80-130° C.;

a calendering temperature is 110-220° C.

8. The preparation method according to claim 1, wherein the superfine main fibers are selected from one or more of the group consisting of stretched polyethylene terephthalate fibers (stretched PET), polyacrylonitrile fibers (PAN), polyamide fibers (PA) and polypropylene fibers (PP); and the thermoplastic bonded fibers are selected from one or more of the group consisting of polyethylene fibers (PE), polypropylene fibers (PP), unstretched polyethylene terephthalate fibers (unstretched PET), PP/PE bi-component fibers, PET/PE bi-component fibers, PET/PP bi-component fibers and PET/co-PET bi-component fibers.

9. The preparation method according to claim 1, wherein, a method for preparing the inorganic coating comprises: according to the composition of the inorganic coating, sequentially adding the dispersants and the water-retaining agents to deionized water and stirring; adding the inorganic particles and dispersing; filtering to obtain a dispersion liquid through a strainer; adding the adhesive resins to the dispersion liquid, and continuing to disperse to obtain a pulp of the inorganic coating.

10. The preparation method according to claim 9, wherein, the inorganic particles are dispersed at 2500 r/min for 30 min; the adhesive resins are uniformly dispersed in the dispersion liquid for 15 min; the strainer is a strainer of 320 mesh; and the pulp of the inorganic coating has a solid content of 40-60%.

* * * * *